United States Patent [19]
Campolo

[11] Patent Number: 5,255,866
[45] Date of Patent: Oct. 26, 1993

[54] APPARATUS FOR ISOLATING A CORD SECTION FROM TENSION

[75] Inventor: Steve Campolo, Valley Stream, N.Y.

[73] Assignee: Leviton Manufacturing Co., Inc., Little Neck, N.Y.

[21] Appl. No.: 915,035

[22] Filed: Jul. 15, 1992

Related U.S. Application Data

[63] Continuation of Ser. No. 599,951, Oct. 19, 1990, abandoned.

[51] Int. Cl.⁵ .................... B65H 75/36; H01R 13/62
[52] U.S. Cl. .................................... 242/85.1; 24/71.3; 24/129 A; 439/369; 439/457
[58] Field of Search ............... 242/85.1, 100.1; 24/71.3, 71.2, 129 A, 129 R; 439/369, 371, 456, 457, 458, 501

[56] References Cited

U.S. PATENT DOCUMENTS

| | | | |
|---|---|---|---|
| 571,761 | 11/1896 | Gulliford | 24/129 A |
| 2,231,001 | 2/1941 | Engstrom | 242/85.1 |
| 2,587,707 | 3/1952 | Dever | 242/85.1 |
| 3,249,318 | 5/1966 | Wormser | 242/85.1 |
| 3,460,779 | 8/1969 | Peasley | 242/85.1 |
| 3,806,992 | 4/1974 | Reimer | 24/71.2 |
| 4,183,603 | 1/1980 | Donarummo | 439/369 |
| 4,884,979 | 12/1989 | Budner | 439/369 |

FOREIGN PATENT DOCUMENTS

| | | | |
|---|---|---|---|
| 3343233 | 5/1985 | Fed. Rep. of Germany | 439/369 |
| 765135 | 2/1933 | France | 242/85.1 |

*Primary Examiner*—Stanley N. Gilreath
*Assistant Examiner*—John Rollins
*Attorney, Agent, or Firm*—Paul J. Sutton

[57] ABSTRACT

A stair relief device is positioned around connecting plugs, splice or the like to relieve the contained plugs, splice or the like from any tension which is in the cord. It consists of a rigid hollow cylinder having two rigid circular flanges, extending outwardly at opposite ends of the cylinder. Each of these flanges has positioned therein two slots of appropriate size and shape to permit an electrical cord to pass through the slot. On each flange the two slots are positioned one hundred and eighty degrees (180°) around the flange from each other. The slots in each flange are aligned directly opposite the slots in the other flange. The section of the cord to be protected is positioned within the cylindrical portion of the device. The cord at either end of the device is then positioned back through the slots in the flanges and turned at least one hundred and eighty degrees (180°) around the outer portion of the cylinder and through the corresponding slots in the other side of the flange, thereby transmitting the tension on the cords through the cylindrical body rather than through the section to be protected.

1 Claim, 3 Drawing Sheets

APPARATUS FOR ISOLATING A CORD SECTION FROM TENSION

This application is a continuation of application Ser. No. 07/599,951 filed Oct. 19, 1990 and now abandoned.

BACKGROUND OF THE INVENTION

The present invention relates to an article of manufacture for the relief of tension on a section of wire, cord or the like and, in particular, for alleviating tension on the portion of an electrical cord where connecting plugs, a splice, a small device or the like is located.

STATE OF THE ART

Conventional strain relief devices include, without limitation, cord winders and integral structures around which cords are wound in order to relieve the strain upon the cords when stresses are applied thereto. These include fixed, non-movable H-shaped integral structures about which cords are wound within the confines of the "legs" of the H-shaped integral structures, where the distance between surfaces contacted by the wound cord is relatively small. As of the date of the filing of the present application, no prior art search has been made.

SUMMARY OF THE INVENTION

The portion of an electrical cord or cable where connecting plugs or a splice are located may form the weakest section of the electrical cord or cable, and as such, is most likely to separate under tension. Equally, a small electrical device such as a transformer positioned along an electrical cord may need to be protected from excess tension in the cord.

The present invention is an article of manufacture to be positioned around such connecting plugs, splice or the like to relieve the contained plugs, splice or the like from any tension which is in the cord. It consists of a rigid hollow cylinder having two rigid circular flanges, extending outwardly at opposite ends of the cylinder. Each of these flanges has positioned therein two slots of appropriate size and shape to permit an electrical cord to pass through the slot. On each flange the two slots are positioned one hundred and eighty degrees (180°) around the flange from each other. The slots in each flange are aligned directly opposite the slots in the other flange.

In use, the weakest section of the cord or cable, such as an electrical male and female plug connecting two electrical cords together to form a single electrical line, is positioned within the hollow cylinder. The cords on either side of the portion to be protected proceed in opposite direction through the cylinder and out of the opposite ends of the cylinder. They are each bent back through the corresponding slots opposite each other in the respective flanges where they emerge from the cylinder. Each such cord is then wound around the outer surface of the hollow cylinder between the flanges, passing through the unfilled slot in the opposite end flange, thereby wrapping itself, one hundred and eighty degrees (180°) around the hollow cylinder, i.e. both portions of the respective cords in the device are positioned around and turn over one-half of the outer surface of the hollow cylinder. In most applications the use of a single half turn around the hollow cylinder is preferable to reduce the overall inductance of the system. However, where there are large tensions in the cord and/or when the device is used with a non-electrical conducting cord or rope, it may be preferable to wrap the cord two or more times around the cylinder.

By this arrangement, as in a capstan, force is transmitted from the cable to the cylinder around which the cable is wound. The tension in the combined cord will be transmitted through the body of the flanges and hollow cylinder rather than through the weakened section, isolating the weak section from the tension in the combined cord.

BRIEF DESCRIPTION OF THE DRAWINGS

A preferred embodiment of the present invention representing the best mode presently contemplated for carrying out the invention is illustrated in the accompanying drawings, in which.

DETAILED DESCRIPTION OF THE ILLUSTRATED EMBODIMENT

Figure 1:
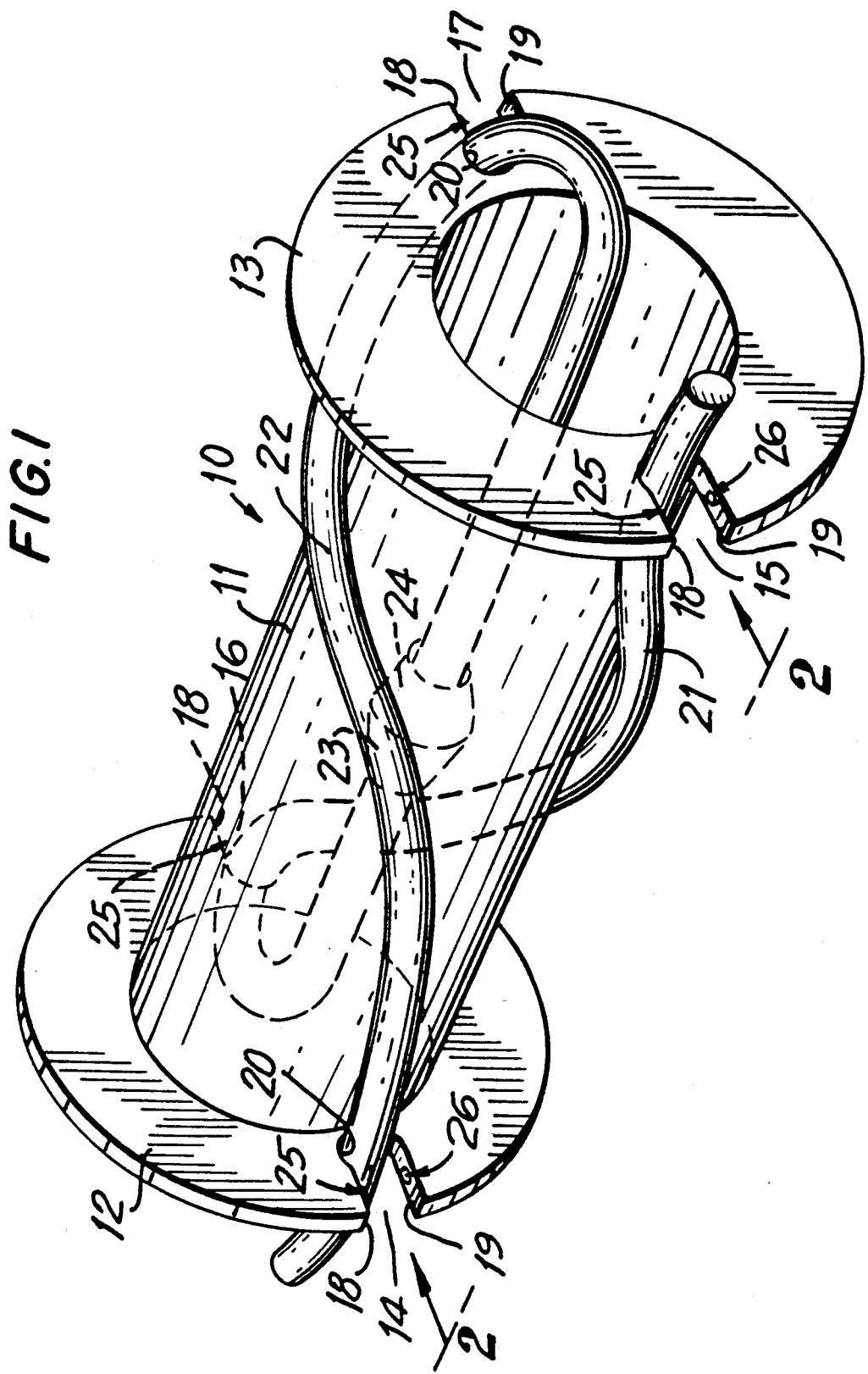
FIG. 1 is a perspective view of the article of manufacture with an electrical extension cord positioned thereon and showing the cord's position within and on the other side of the device by dotted lines.
Figure 2:
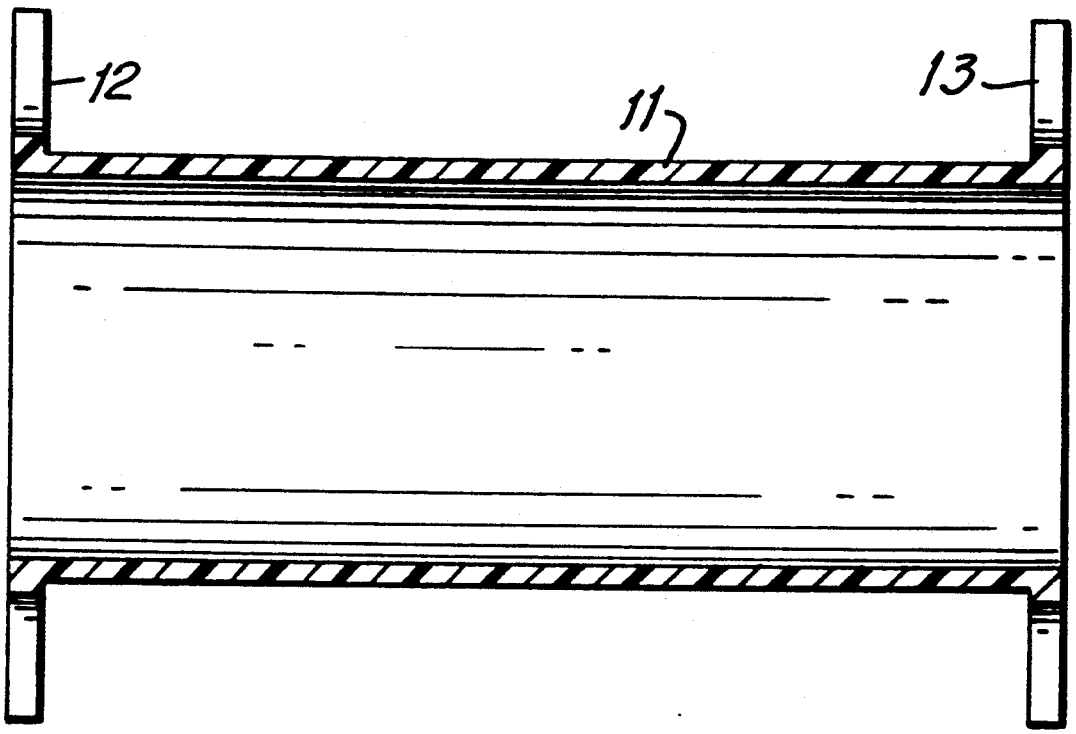
FIG. 2 is a sectional view taken along line 2—2 of FIG. 1 without an electrical cord mounted thereon.

While the article of manufacture of the present invention is shown in the drawings and discussed below in terms of its application with regard to two electrical cords joined together by a male or female plug to form a single cord, this apparatus may be used with any cord, wire, rope, or the like wherein there is a weaker portion which is to be protected against tension therein. Equally, the device may not only be used to relieve tension on electrical plugs, but on electrical devices, splices or other weakened areas along such cord, wire, rope or the like.

As seen in the drawings, the cord strain relief device (10) of the present invention is an article of manufacture consisting of a hollow cylinder (11) having two circular flanges (12 & 13), extending radially outwardly from the outer surface of the cylinder (11) at each end. The cylinder (11) and end flanges (12 & 13) are a unitary structure which can may be made from any sufficiently strong material, including plastics such as polyethylene and polypropylene.

Each of the flanges (12 & 13) are formed in a plane perpendicular to the cylinder (11), i.e. at right angles to the central axis of the cylinder (11). Each of the flanges (12) and (13) have a first slot (14) and (15) positioned in corresponding positioned opposite each other in their respective flange (12 & 13), and a second set of slots (16) and (17) slots also correspondingly positioned opposite each other. Opposite slots (14) and (15) are positioned one hundred and eighty degrees (180°) around said cylindrical member (11) from opposite slots (16) and (17).

Figure 3:
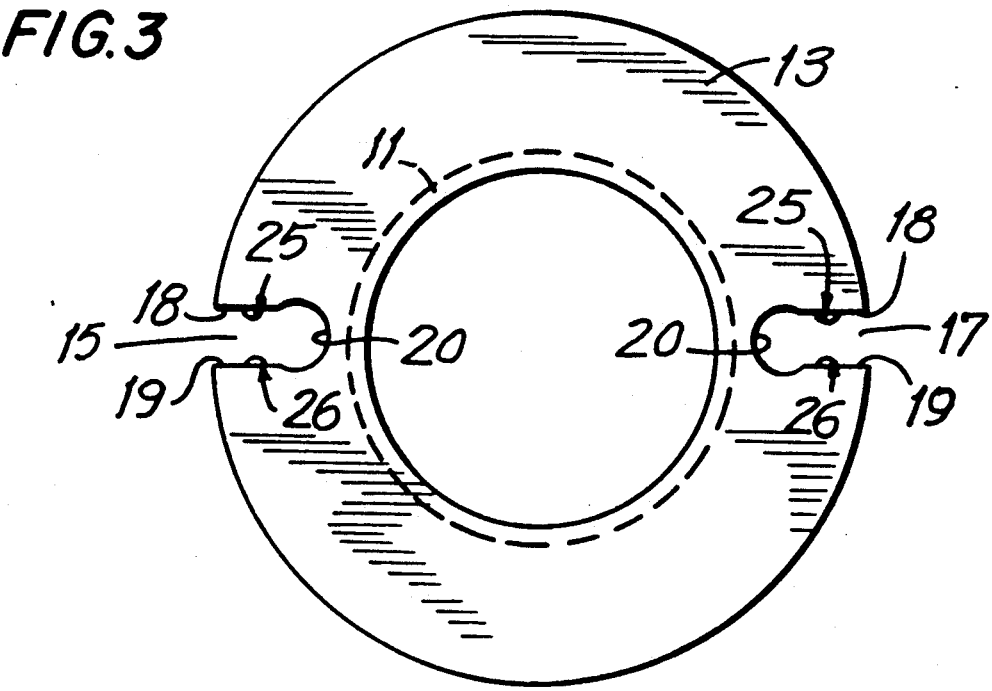
FIG. 3 is an end view of the cord strain relief device in accordance with the present invention without a cord mounted thereon and showing the outer surface of the cylinder portion in dotted lines.
Figure 4:
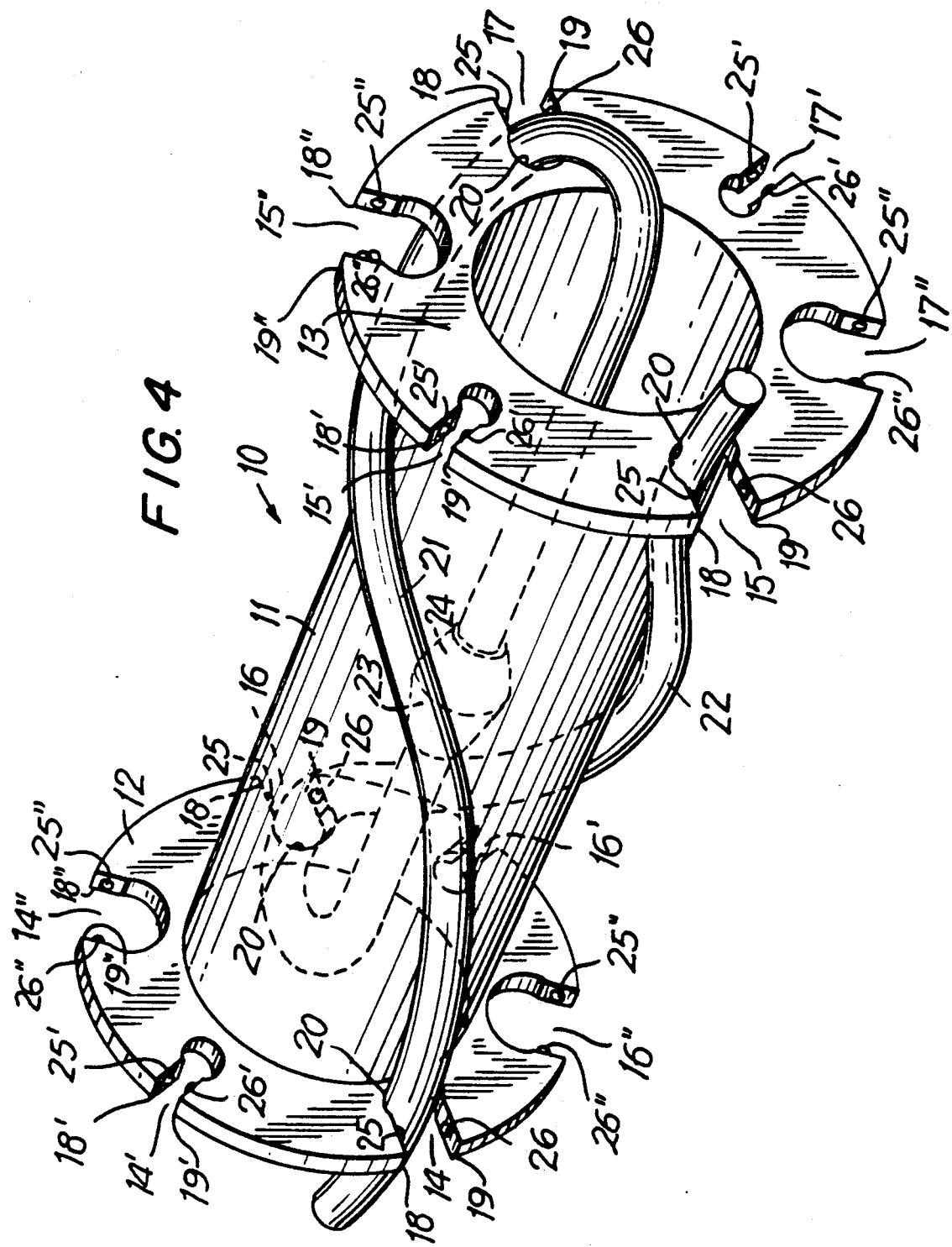
FIG. 4 is a perspective view of another embodiment of the present invention having multiple sets of slots therein for use with cords of different diameters.

As seen most clearly in FIG. 3, these slots consist of two straight, parallel walls (18 & 19), leading to a circular section (20). The diameter of the circular section (20) may either be slightly larger or the same as the distance between walls (18 & 19) respectively. The spacing between walls (18 & 19) are such that an electrical cord (21 & 22) can be positioned through slots (14–17). The slots may be sufficiently close together to restrain easy movement of the cord but not so tight to prevent movement by manual force, thereby holding the wire in the circular section (20) from casual removal of the cord, i.e. an interference fit. Alternately, two bumps (25 & 26) can project from the walls (18 & 19) to make such an interference fit with the cord to prevent casual removal of the cord.

As seen in FIG. 1, two electrical cords (21 & 22) are joined together to form a single electrical line by means of a male plug (23) and female plug (24). In order to assure that the plugs (23 & 24) do not come apart in use if cords (21 & 22) are subject to tension, the plugs (23 & 24) are positioned inside cylinder (11) with their respective cords (21 & 22) positioned in opposite directions along the insides of cylinder (11). To isolate the plugs (23 & 24), the cords (21 & 22) are wound around the cord strain relief device (10). Cord (21) engages the cord strain relief device (10) through slot (15) in flange (13), it winds one hundred and eighty degrees (180°) around cylinder (11), and is positioned in slot (16). It then turns back on itself being thus positioned inside of cylinder (11) where it meets with its plug (23). Similarly, cord (22) traces a similar path around and through the cylinder (11), i.e. it is positioned in slots (14) and (17), thereby twisting one hundred and eighty degrees around the outer surface of cylinder (11), and then is positioned to back on itself to enter cylinder (11), where it meets with its plug (24). While in most applications it is preferable to use a single wrap to lower inductance, in certain situations it may be preferable to have the cords (21 & 22) make two or more turns around the cylinder (11) to increase the contact between the cord (21 & 22) and the cylinder (11).

In this arrangement, as in a capstan, tension on the cords (21) and (22) is transmitted directly to the cord strain relief device (10). This relieves the respective portions of the cords (21 & 22) which are inside the cylinder (11) from the tension. In other words, the cord strain relief device (10) of the present invention isolates the tension that is in cords (21) and (22) respectively from the plugs (23 & 24), transmitting the tension through its body (10) and relieving the strain on the intermediate section of the cords (21 & 22) in the cylinder (11). This allows cords (21) and (22) to be under comparatively high tension without a user having reason for fear of separation of the plugs or other weakened sections positioned within the cylindrical member (11). The cord relief device further acts to protect the section of the cord within the cylinder from mechanical injury, such as being stepped on, rubbed, twisted or otherwise mechanically shocked.

The above embodiment is presented showing slots (14–17) of a size to be used with one particular cord size. Where a number of different sized cords are to be used with a tension device, a series of different sized slots (14'–17, 14"–17") may be spaced around the flanges (12 & 13). Each set of slots are positioned one hundred and eighty degrees (180°) apart, opposite their correspondingly sized slot in the other flange, the difference between each set being the spacing between the walls (18' & 19' and 18" & 19") and/or corresponding bumps (25' & 26' and 25" & 26") for interference fit with different diameter cords.

The embodiment of the present invention herein described and disclosed is presented merely as an example of the invention. Other embodiments coming within the scope of the present invention will be readily suggest themselves to those skilled in the art, and shall be deemed to come within the scope of the appended claims.

I claim:

1. An apparatus for isolating a cord section from tension, said apparatus comprising in combination:
   a cord section comprising at least one cord;
   a tension isolating device comprising:
      a hollow generally cylindrical member;
      first and second annular flanges at opposite ends of said cylindrical member, each of said first and second flanges having first and second slots positioned approximately 180 degrees from each other around each flange, said first and second slots on each flange being of substantially the same shape and area;
      said first slot on said first flange being substantially axially aligned with said first slot on said second flange and said second slot on said first flange being substantially axially aligned with said second slot on said second flange;
      said cord section having a protected section positioned inside said cylindrical member and two wrapped sections adjacent said protected section, each wrapped section emerging from a respective end of said cylindrical member, extending through one of said first slots, wrapping around the outer surface of said cylindrical member at least 180 degrees, and extending through one of said second slots in one of said flanges which is opposite to the flange having the first slot through which the wrapped section extends;
      whereby tension on said wrapped sections results in frictional engagement of said wrapped sections with said outer surface of said cylindrical member and with said slots so that said tension on said wrapped sections is not transmitted to said protected section.

* * * * *